United States Patent [19]

Yamamoto et al.

[11] Patent Number: 4,852,982
[45] Date of Patent: Aug. 1, 1989

[54] GRADED INDEX LENS ARRAY

[75] Inventors: Takashi Yamamoto, Saeki; Yoshihiko Mishina; Masaaki Oda, both of Ohtake, all of Japan

[73] Assignee: Mitsubishi Rayon Co., Ltd., Tokyo, Japan

[21] Appl. No.: 162,121

[22] Filed: Feb. 29, 1988

[30] Foreign Application Priority Data

Nov. 16, 1987 [JP] Japan .................................. 62-287268

[51] Int. Cl.$^4$ ................................................ G02B 1/10
[52] U.S. Cl. .................................... 350/413; 350/96.25
[58] Field of Search ................... 350/413, 96.25, 96.27, 350/167; 355/1

[56] References Cited

FOREIGN PATENT DOCUMENTS 0067706  5/1980  Japan ................................ 350/96.25

Primary Examiner—Bruce Y. Arnold
Assistant Examiner—Rebecca D. Gass
Attorney, Agent, or Firm—Cushman, Darby & Cushman

[57] ABSTRACT

Disclosed is a graded index lens array which gives good resolution even if its end surfaces are not fully polished during its manufacture and which is less likely to suffer loss in resolution due to damage to its surfaces comprising a plurality of graded index lenses made of a synthetic resin and arranged in parallel, characterized in that at least one end surface of the lens array is coated with a cured film formed from a cross-linkable resin consisting essentially of a multifunctional compound having at least two (meth)acryloyloxy groups per molecule, and a fluorinated alkyl (meth)acrylate.

9 Claims, 2 Drawing Sheets

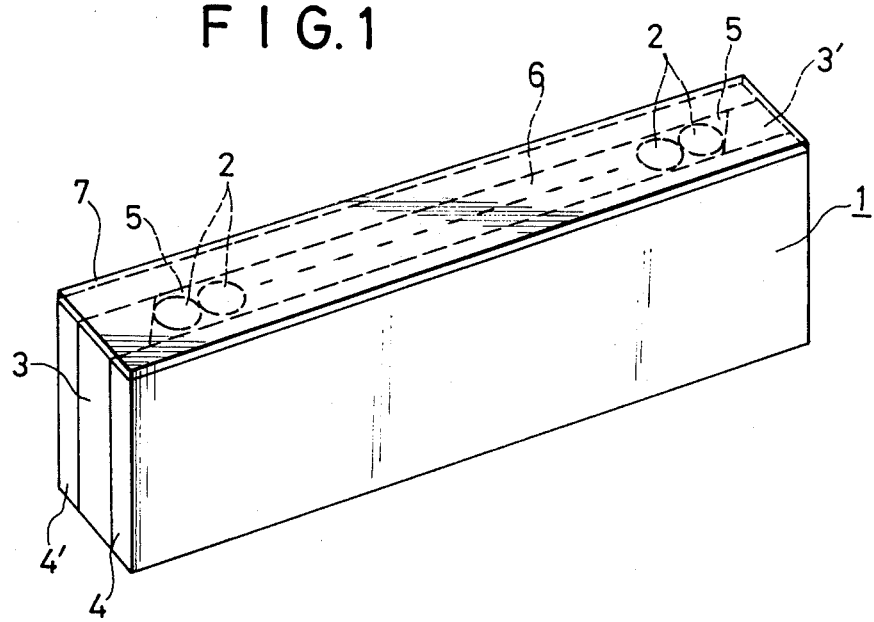
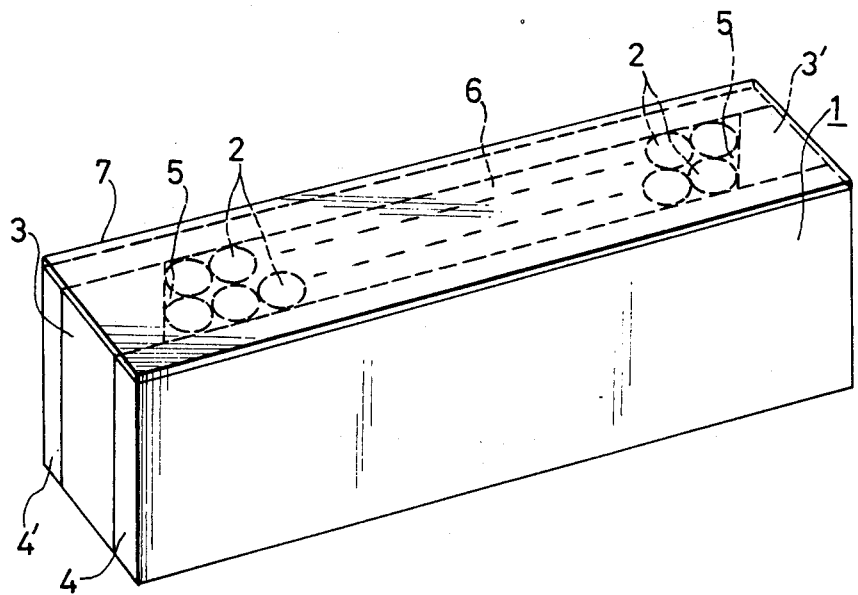

GRADED INDEX LENS ARRAY

BACKGROUND OF THE INVENTION

1. Field of the Invention

This invention relates to a graded index lens array for use as imaging elements in copying machines, facsimile equipment, CRT (cathode ray tube) printers, LED (high-density light-emitting diode) printers, LCD (liquid crystal) printers and similar equipment.

2. Description of the Prior Art

As illustrated in FIG. 4, a graded index lens array 1 for use as an imaging element in copying machines and similar equipment is integrally formed of (a) a pair of parallel resin plates 4 and 4', (b) a plurality of elongated, columnar graded index lenses 2 arranged in parallel and disposed between the resin plates, (c) a resin adhesive 5 filling the spaces between adjacent graded index lenses 2, and (d) a pair of spacers 3 and 3+ disposed at both lateral ends.

In the past, graded index lenses made of inorganic glass have primarily been used. However, graded index lenses made of synthetic resins have several advantages over those made of inorganic glass, in that they are light in weight, have good impact resistance, can be manufactured at low cost, and can be worked easily. Accordingly, the use of graded index lenses made of synthetic resins are now increasing steadily.

Nevertheless, graded index lenses made of synthetic resins are disadvantageous in that their low hardness makes it difficult to polish their end surfaces (optical surfaces) satisfactorily. Moreover, owing to insufficient abrasion resistance, their surfaces tend to be damaged by contact with other objects, impact, scratches and dust wiping as encountered when the lens array is mounted in equipment or used for the intended purpose. This may cause a loss in resolution and prevent the lens array from forming an accurate image on the focal plane.

SUMMARY OF THE INVENTION

It is an object of the present invention to provide a lens array comprising a plurality of graded index lenses made of a synthetic resin which lens array can give good resolution even if its end surfaces are not fully polished during the manufacture thereof and which lens array is less liable to suffer a loss in resolution due to damage of the lens surfaces.

According to the present invention, there is provided a graded index lens array comprising a plurality of graded index lenses made of a synthetic resin and arranged in parallel, characterized in that at least one end surface of the lens array is coated with a cured film formed from a cross-linkable resin consisting essentially of a multifunctional compound having two or more (meth)acryloyloxy groups per molecule, and a fluorinated alkyl (meth)acrylate.

BRIEF DESCRIPTION OF THE DRAWINGS

FIG. 1 is a perspective view of a graded index lens array (hereinafter referred to briefly as "lens array") embodying the present invention;

FIG. 2 is a perspective view of another embodiment of the lens array of the present invention;

DETAILED DESCRIPTION OF THE PREFERRED EMBODIMENTS

Figure 3:
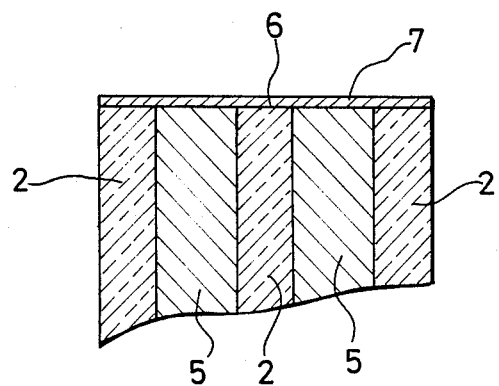
FIG. 3 is an enlarged sectional view of the principal part of the lens array of FIG. 1.

The present invention will be described hereinbelow with reference to the accompanying drawings.

Referring first to FIGS. 1 and 2, the lens array of the present invention comprises a plurality of graded index lenses arranged in a row or rows, and at least one end surface 6 of the lens array is coated with a cured film 7 formed from a cross-linkable resin. The cross-linkable resin forming this cured film consists essentially of a multifunctional compound having two or more (meth)acryloyloxy groups per molecule, and a fluorinated alkyl acrylate.

Specific examples of the multifunctional compound having two or more (meth)acryloyloxy groups per molecule (hereinafter referred to as the multifunctional acrylic compound) include (1) the compounds obtained by the reaction of a polyhydric alcohol with (meth)acrylic acid, a halogenated product or a lower alkyl ester thereof, such as ethylene glycol di(meth)acrylate, 1,3-propylene glycol di(meth)acrylate, 1,4-butanediol di(meth)acrylate, 1,6-hexanediol di(meth)acrylate, diethylene glycol di(meth)acrylate, neopentyl glycol di(meth)acrylate, 2,2-bis(4-acryloyloxyphenyl)propane, 2,2-bis(4-acryloyloxydiethoxyphenyl)propane, 2,2-bis(4-methacryloyloxydiethoxyphenyl)propane, 2,2-bis[4-acryloyloxy(2-hydroxypropoxy)phenyl]propane, 2-(4-acryloyloxydiethoxyphenyl)-2-(4-acryloyloxyethoxyphenyl)propane, 2-(4-methacryloyloxypropoxyphenyl)-2-(4-acryloyloxypropoxyphenyl)propane, trimethylolpropane di(meth)acrylate, pentaerythritol di(meth)acrylate, trimethylolpropane tri(meth)acrylate, diglycerol tetra(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, trimethylolethane and trimethylolpropane; and (2) the unsaturated polyesters obtained by the reaction of a polyhydric alcohol (such as glycerol and pentaerythritol), (meth)acrylic acid, and a polycarboxylic acid (such as malonic acid, succinic acid, adipic acid, glutaric acid and sebacic acid); and the like.

The fluorinated alkyl (meth)acrylate used in combination with the multifunctional acrylic compound preferably has an alkyl group of 2 to 14 carbon atoms. Specific examples of such fluorinated alkyl (meth)acrylates include 2,2,2-trifluoroethyl (meth)acrylate, 2,2,3,3-tetrafluoropropyl (meth)acrylate, 1,1,1,3,3,3-hexafluoroisopropyl (meth)acrylate, 1H,1H,5H-octafluoropentyl (meth)acrylate, 1H,1H,2H,2H-heptadecafluorodecyl (meth)acrylate, 1H,1H,2H,2nonadecafluorododecyl (meth)acrylate and 1H,1H,2H,2H-heneicosafluorotetradecyl (meth)acrylate. Among these compounds, 2,2,2-trifluoroethyl (meth)acrylate is especially preferred.

The fluorinated alkyl (meth)acrylate present in the cross-linkable resin plays an important role in adjusting the refractive index of the resulting cured film to any desired value. If a cured film is formed from a multifunctional acrylic compound alone, its refractive index is generally high and it is difficult to obtain a cured film having a refractive index of 1.50 or less.

In due consideration of the resolution of the lens array and of the abrasion resistance of the lens surfaces, the cross-linkable resin should comprise 20 to 99.9 parts by weight, preferably 30 to 95 parts by weight, of the multifunctional acrylic compound and 80 to 0.1 parts by weight, preferably 70 to 5 parts by weight, of the fluorinated alkyl acrylate.

In order to control the refractive index of the cured film and improve the adhesion thereof, the aforesaid resin may additionally contain a monofunctional unsaturated compound. Monofunctional unsaturated compounds useful for this purpose include, for example, methyl (meth)acrylate, ethyl (meth)acrylate, propyl (meth)acrylate, 2-ethylhexyl (meth)acrylate, methoxy diethylene glycol (meth)acrylate, ethoxyethyl (meth)acrylate, tripropylene glycol (meth)acrylate, glycidyl (meth)acrylate, tetrahydrofurfuryl (meth)acrylate, 2-hydroxyethyl (meth)acrylate, 2-hydroxypropyl (meth)acrylate, 1,4-butylene glycol (meth)acrylate and ethyl carbitol (meth)acrylate. In the cross-linkable resin, one or more of these monofunctional unsaturated compounds may be present in an amount not greater than 30 parts by weight.

The lens array of the present invention comprises a plurality of graded index lenses made of a synthetic resin. These graded index lenses are cylindrical optical elements which, as described in Japanese Patent Publication No. 28059/'72, have a gradient of refractive index ranging from a maximum value at the center of the circular cross-section to a minimum value at the periphery thereof and can provide lens-like action owing to this graded refractive index.

These graded index lenses can be made according to any of various methods including, for example, those described in Japanese Patent Publication No. 29682/'82, Japanese Patent Publication No. 28059/'72 and Japanese Patent Application No. 130873/'85.

The material of which the graded index lenses are made may be selected from various transparent resins including those composed chiefly of methyl methacrylate or styrene. One preferred example is the composition described in Japanese Patent Application No. 130837/'85, which comprises a copolymer composed chiefly of polyvinylidene fluoride or vinylidene fluoride and a copolymer composed chiefly of polymethyl methacrylate or methyl methacrylate. In this case, the amount of methyl methacrylate used is preferably such that the composition contains 20 to 90% by weight of methyl methacrylate units.

Figure 4:
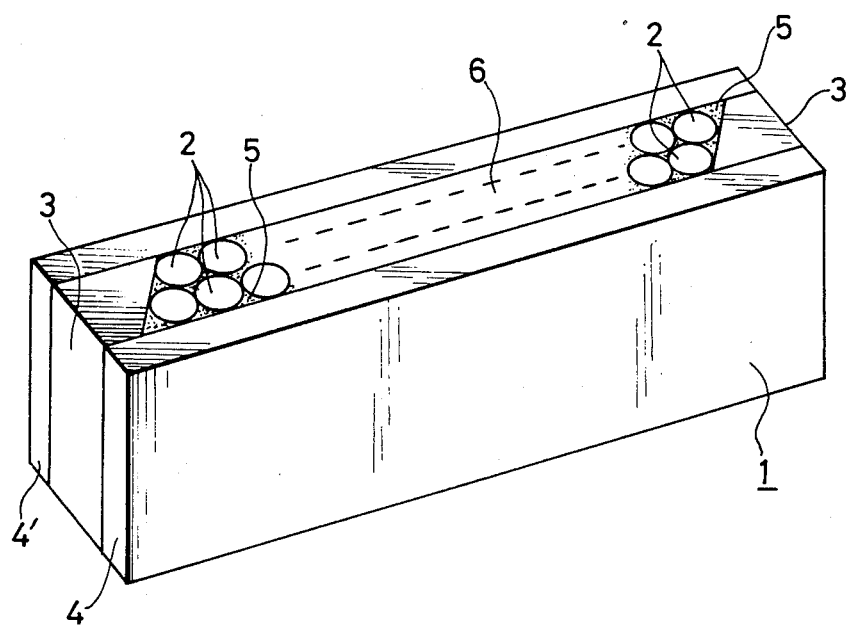
FIG. 4 is a perspective view of a prior art lens array.

The lens array comprising such graded index lenses may be formed in any of various manners. For example, as illustrated in FIG. 4, this can be done by disposing two parallel supporting plates 4 and 4', arranging a plurality of graded index lenses 2 in a row or rows between the supporting plates in such a way that the lenses are adjacent to each other and their optical axes are parallel to the spacers 3 and 3', filling an adhesive in the spaces between adjacent graded index lenses 2, and disposing spacers 3 and 3' at both lateral ends. As the adhesive, there may be used epoxy resins, silicone resins, acrylic resins, asphalt resins and the like. As the spacers and the supporting plates, there may be used plates made of resins such as PMMA, etc., FRPs such as glass-fiber reinforced epoxy resins, etc., and metals such as aluminum, etc.

The cured film is formed by applying the above-described cross-linkable resin to at least one end surface of the lens array and then curing it.

The cured film is preferably formed in such a way that its refractive index ($n_c$) meets the requirements defined by:

$$n_0 - 0.1 \leqq n_c \leqq n_0 + 0.1 \quad (1)$$

where $n_0$ is the refractive index of the graded index lenses at the optical axis thereof. The end surface of the lens array may be polished before the cross-linkable resin is applied thereto. However, where the cured film is formed so as to have a refractive index ($n_c$) meeting the requirements defined by the above inequality (1), the end surface of the lens array may be directly coated with the cross-linkable resin without polishing it. When an unpolished end surface of the lens array is coated with the cross-linkable resin, the refractive index of the cured film is preferably closer to &hat of the lenses than when the end surface is polished, in order to avoid the occurrence of refraction and/or reflection at the interface between the lens surface and the cured film. It is most preferable that the refractive index, $n_C$, of the cured film formed from the cross-linkable resin be between the refractive index, $n_0$, of the lenses on the longitudinal axis thereof and the refractive index, $n_1$, of the lenses at the periphery thereof.

In order to apply the cross-linkable resin to the end surface of the lens array, there may be used any of various coating techniques such as roll coating, brush coating, spray coating and dip coating. The coating film may be cured by exposure to various types of high-energy radiation such as $\alpha$-rays, $\beta$-rays, $\gamma$-rays and electron rays, or by exposure to light in the wavelength range of 2000 to 8000 Å and, in particular, 3000 to 5000 Å. Where the coating film is cured by exposure to light, it is necessary to add a photosensitizer to the cross-linkable resin.

Specific examples of the photosensitizer include benzoin, benzoin methyl ether, benzoin ethyl ether, benzoin butyl ether, benzoin isopropyl ether, benzoin propyl ether, benzil, benzophenone, methyl phenylglyoxylate and the like. The photosensitizer may be used in an amount of 0.01 to 10 parts by weight per 100 parts by weight of the cross-linkable resin. If the amount of photosensitizer used is too great, the resulting cured film may undesirably be colored.

The cured film formed on at least one end surface of the lens array generally has a thickness of 0.5 to 100 μm and preferably 1 to 50 μm.

The lens array having the above-described cured film on at least one end surface thereof is resistant to damage during use. Moreover, the resolution of the lens array, when expressed by the response function (MTF value) at a spatial frequency of 2 lp/mm, is as high as 20% or more.

MTF value which is also known as the modulation transfer function, is the value obtained by forming an image of a rectangular-wave lattice pattern with the lens array, detecting the resulting image with a CCD image sensor, and using the detected light intensity levels to make a calculation according to the following equation.

$$MTP = \frac{i_{max} - i_{min}}{i_{max} + i_{min}} \times 100 \; (\%) \quad (2)$$

where $i_{max}$ and $i_{min}$ are the maximum and minimum values, respectively, of the rectangular-wave response.

The spatial frequency means the frequency of the rectangular-wave lattice pattern used for this purpose. More specifically, when a pair of high and low light intensity levels is defined as a line pair (lp), the spatial frequency is expressed by the number of line pairs per unit length. Thus, the spatial frequency of 2 lp/mm represents a rectangular-wave lattice pattern having 2 line pairs per millimeter.

The lens array of the present invention has the outstanding feature that its lens surfaces are less subject to damage because of their high abrasion resistance and, therefore, it can form an accurate image on the focal plane even after long-term use without suffering a loss in resolution. Moreover, when the refractive index of the cured film formed on the end surfaces of the lens array is made close to that of the graded index lenses, the polishing operation of its end surfaces may be omitted during the manufacture thereof.

The present invention is further illustrated by the following examples.

EXAMPLE 1 AND COMPARATIVE EXAMPLE 1

A mixture was prepared by mixing 33 parts by weight of a copolymer (with a refractive index, $n_D$, of 1.400) composed of 80 mole % of vinylidene fluoride and 20 mole % of tetrafluoroethylene, 33 parts by weight of polymethyl methacrylate (with a refractive index, $n_D$, of 1.492) obtained by continuous bulk polymerization, 33 parts by weight of methyl methacrylate monomer, 0.1 part by weight of benzyl dimethyl ketal, and 0.1 part by weight of hydroquinone. This mixture was heated to 80° C., passed through the kneading section of an extruder, and then extruded through a nozzle having an orifice diameter of 2 mm to form a fiber. Then, the extruded fiber was passed, over a period of 8 minutes, through an evaporation zone which was heated to 80° C. and in which nitrogen gas was flowing at a rate of 10 liters per minutes. Thereafter, it was passed through the center of an irradiation zone provided with six 400 W high-pressure mercury vapor lamps arranged circularly and equidistantly, irradiated with light for 5 minutes, and then taken off with nip rollers at a speed of 20 cm per minute.

The resulting fiber had a diameter of 800 μm. When measured under an Interfaco interference microscope, the refractive index of the fiber was 1.460 at the center and 1.451 at the periphery, and decreased continuously from the center to the periphery. When the composition of the fiber was analyzed by nuclear magnetic resonance (NMR) spectroscopy, the copolymer of vinylidene fluoride and tetrafluoroethylene was found to be present in an amount of 33% by weight at the center and 43% by weight at the periphery. The amount of residual methyl methacrylate was 0.9% by weight on the whole.

A dye solution was prepared by dissolving a black oil-soluble dye (Orient Oil Black HBB) in methylene chloride at a concentration of 10% by weight. The above graded index fiber was soaked in the dye solution kept at 0° C., removed after 30 seconds, and then dried at 60° C. When a cross-section of this fiber was observed under a microscope, its peripheral region was dyed black to a depth of about 15 μm from the surface.

Using segments (lens elements) of the fiber impregnated with the black dye, a number of lens arrays comprising a plurality of lens elements arranged in a row or in two rows as illustrated in FIGS. 1 and 2 were made. Both end surfaces of each lens array were finished with a milling cutter.

The spacers and the supporting plates comprised polymethyl methacrylate resin plates, and the adhesive comprised an epoxy adhesive having carbon black incorporated therein.

The one-row type lens arrays comprised 250 fiber segments, and the two-row type lens arrays comprised 500 fiber segments.

Then, using a brush, both end surfaces of a number of the aforesaid lens arrays were coated with a cross-linkable resin composition comprising 50 parts by weight of dipentaerythritol pentaacrylate, 50 parts by weight of 2,2,2-trifluoroethyl acrylate, and 1.5 parts by weight of methyl phenylglyoxylate. The coating film was cured by placing the coated lens arrays at a position 20 cm below a 9 kW high-pressure mercury vapor lamp (manufactured by Eye Graphic Co.) and irradiating them with light for 5 seconds. The resulting cured film had a thickness of about 20 μm and a refractive index, $n_C$, of 1.455.

For purposes of comparison, the end surfaces of a number of lens arrays were not coated with a cured film, but finished by buffing.

When the lens arrays having a cured film formed on both end surfaces and those having no cured film were tested for resolution, their MTF values at a spatial frequency of 2 lp/mm were all found to be 65%.

Moreover, the lens arrays having a cured film and those finished by buffing were subjected to rubbing tests and, thereafter, their MTF values were measured. The results thus obtained are shown in Table 1.

TABLE 1

| | Resolution (%) | | | |
| --- | --- | --- | --- | --- |
| | Buffing | | Cured film | |
| | One-row type | Two-row type | One-row type | Two-row type |
| No rubbing test | 65 | 65 | 65 | 65 |
| Rubbed 100 times with cotton wool soaked in isopropyl alcohol | 60 | 62 | 65 | 65 |
| Rubbed 100 times with steel wool (#000) | 10 | 10 | 65 | 65 |
| Rubbed 10 times with an end surface of another lens array | 35 | 40 | 65 | 65 |

EXAMPLE 2

Using one of the one-row type lens arrays made in Example 1, both end surfaces thereof were coated with a cured film in the same manner as described in Example 1, except that the cross-linkable resin composition used in this example comprised 60 parts by weight of dipentaerythritol pentaacrylate, 5 parts by weight of 2,2,2-trifluoroethyl methacrylate, 5 parts by weight of trimethylolpropane triacrylate, 30 parts by weight of tetrahydrofurfuryl acrylate, and 3 parts by weight of benzyl dimethyl ketal. The cured film formed on this lens array had a thickness of about 30 μm and a refractive index, $n_C$, of 1.505.

When this lens array was tested for resolution, its MTF value at a spatial frequency of 2 lp/mm was found to be 60%. In addition, one end surface of this lens array was rubbed 10 times with steel wool (#000), but the MTF value remained unchanged.

COMPARATIVE EXAMPLE 2

Using one of the one-row type lens arrays made in Example 1, both end surfaces thereof were coated with a cured film in the same manner as described in Example 1, except that the cross-linkable resin composition used in this comparative example comprised 100 parts by weight of phenyl methacrylate and 3 parts by weight of 1-hydroxycyclohexyl phenyl ketone.

The cured film formed on this lens array had a thickness of about 15 μm and a refractive index, $n_C$, of 1.570.

When the lens array coated with this cured film was tested for resolution, its MTF value at a spatial frequency of 2 lp/mm was found to be 18%. In addition, one end surface of this lens array was rubbed 10 times with steel wool (#000), so that the MTF value was reduced to 5%.

EXAMPLE 3

Using one of the one-row type lens arrays made in Example 1, both end surfaces thereof were coated with a cured film in the same manner as described in Example 1, except that the cross-linkable resin composition used in this example comprised 40 parts by weight of dipentaerythritol pentaacrylate, 30 parts by weight of 2,2,2-trifluoroethyl acrylate, 30 parts by weight of methyl acrylate, and 3 parts by weight of benzyl dimethyl ketal.

The cured film formed on this lens array had a thickness of about 25 μm and a refractive index, $n_C$, of 1.466.

When this lens array was tested for resolution, its MTF value at a spatial frequency of 2 lp/mm was found to be 62%. Moreover, one end surface of this lens array was rubbed 10 times with steel wool (#000), but the MTF value remained unchanged.

EXAMPLE 4

A fiber having a diameter of 1000 μm was formed in the same manner as described in Example 1, except that the mixture used in this example comprised 20 parts by weight of a copolymer composed of 80 mole % of vinylidene fluoride and 20 mole % of tetrafluoroethylene, 30 parts by weight of polymethyl methacrylate obtained by continuous bulk polymerization, 50 parts by weight of methyl methacrylate monomer, and 0.2 part by weight of 1-hydroxycyclohexyl phenyl ketone. When measured under an Interfaco interference microscope, the refractive index of the fiber was 1.467 at the center and 1.460 at the periphery, and decreased continuously from the center to the periphery.

The above graded index fiber was treated with a dye solution in the same manner as described in Example 1, so that its peripheral region was dyed black to a depth of about 15 μm from the surface. Using segments of the resulting fiber, a number of lens arrays as illustrated in FIG. 1 were made. Both end surfaces of each lens array were finished with a milling cutter.

The spacers and the supporting plates comprised polymethyl methacrylate resin plates, and the adhesive comprised an acrylic adhesive having carbon black incorporated therein.

Then, using a brush, both end surfaces of one of the aforesaid lens arrays were coated with a cross-linkable resin composition comprising 50 parts by weight of dipentaerythritol pentaacrylate, 50 parts by weight of 2,2,2-trifluoroethyl acrylate, and 1.5 parts by weight of methyl phenylglyoxylate. The coating film was cured in the same manner as described in Example 1. The resulting cured film had a thickness of about 20 μm and a refractive index, $n_C$, of 1.455.

When this lens array was tested for resolution, its MTF value at a spatial frequency of 2 lp/mm was found to be 65%. Moreover, one end surface of this lens array was rubbed 10 times with steel wool (#000), but the MTF value remained unchanged.

EXAMPLE 5

Using one of the lens arrays made in Example 4, both end surfaces thereof were coated with a cured film in the same manner as described in Example 1, except that the cross-linkable resin composition used in this example comprised 40 parts by weight of dipentaerythritol pentaacrylate, 30 parts by weight of 2,2,3,3-tetrafluoropropyl acrylate, 30 parts by weight of methyl acrylate, and 3 parts by weight of benzyl dimethyl ketal.

The cured film formed on this lens array had a thickness of about 30 μm and a refractive index, $n_C$, of 1.467.

When this lens array was tested for resolution, its MTF value at a spatial frequency of 2 lp/mm was found to be 68%. Moreover, one end surface of this lens array was rubbed 10 times with steel wool (#000), but the MTF value remained unchanged.

What is claimed is:

1. A graded index lens array comprising a plurality of graded index lenses made of a synthetic resin and arranged in parallel, characterized in that at least one end surface of said lens array is coated with a cured film formed from a cross-linkable resin consisting essentially of a multifunctional compound having two or more (meth)acryloyloxy groups per molecule, and a fluorinated alkyl (meth)acrylate.

2. A graded index lens array as claimed in claim 1 wherein said cross-linkable resin comprises 20 to 99.9 parts by weight of said multifunctional compound having two or more (meth)acryloyloxy groups per molecule and 80 to 0.1 parts by weight of said fluorinated alkyl (meth)acrylate.

3. A graded index lens array as claimed in claim 1 wherein said fluorinated alkyl (meth)acrylate has an alkyl group of 2 to 14 carbon atoms.

4. A graded index lens array as claimed in claim 3 wherein said fluorinated alkyl (meth)acrylate is either 2,2,2-trifluoroethyl acrylate or 2,2,2-trifluoroethyl methacrylate.

5. A graded index lens array as claimed in claim 1 wherein the refractive index, $n_C$, of said cured film meets the requirements defined by $$n_0 - 0.1 \leq n_C \leq n_0 + 0.1 \quad (1)$$

where $n_0$ is the refractive index of said graded index lenses at the optical axis thereof.

6. A graded index lens array as claimed in claim 5 wherein the refractive index, $n_C$, of said cured film is between the refractive index, $n_0$, of said graded index lenses on the longitudinal axis thereof and the refractive index, $n_1$, of said graded index lenses at the periphery thereof.

7. A graded index lens array as claimed in claim 1 wherein said graded index lenses are made of a resin composition containing 20 to 90% by weight of methyl methacrylate units.

8. A graded index lens array as claimed in claim 1 wherein said graded index lenses are arranged in a row.

9. A graded index lens array as claimed in claim 1 wherein said graded index lenses are arranged in at least two rows.

* * * * *